United States Patent [19]

Belperin

[11] 4,008,926
[45] Feb. 22, 1977

[54] DEVICE FOR FIXING A BEARING ON A CONCRETE MASS

[75] Inventor: Gérard Belperin, Valdoie, France

[73] Assignee: Groupe Europeen pour la Technique des Turbines a Vapeur G.E.T.T., Paris, France

[22] Filed: Dec. 12, 1975

[21] Appl. No.: 640,299

[30] Foreign Application Priority Data

Dec. 27, 1974  France ............................ 74.43063

[52] U.S. Cl. .................................. 308/3 R; 308/15
[51] Int. Cl.² .......................................... F16C 5/00
[58] Field of Search ............... 308/15, 22, 24, 3 R; 248/49

[56] References Cited

UNITED STATES PATENTS

| 3,087,206 | 4/1963 | Delf et al. ...................... 308/3 R X |
| 3,233,376 | 2/1966 | Naillon et al. ...................... 308/3 R |
| 3,484,882 | 12/1969 | Blanchette ...................... 308/3 R X |

*Primary Examiner*—Joseph F. Peters
*Assistant Examiner*—Gene A. Church
*Attorney, Agent, or Firm*—Sughrue, Rothwell, Mion, Zinn & Macpeak

[57] ABSTRACT

The invention concerns the fixing of a bearing on a concrete mass. It is characterized in that a metallic frame surrounding the support of the bearing is provided with arms sunk in the concrete mass. The invention applies more particularly to bearings of turbo-alternator groups.

4 Claims, 4 Drawing Figures

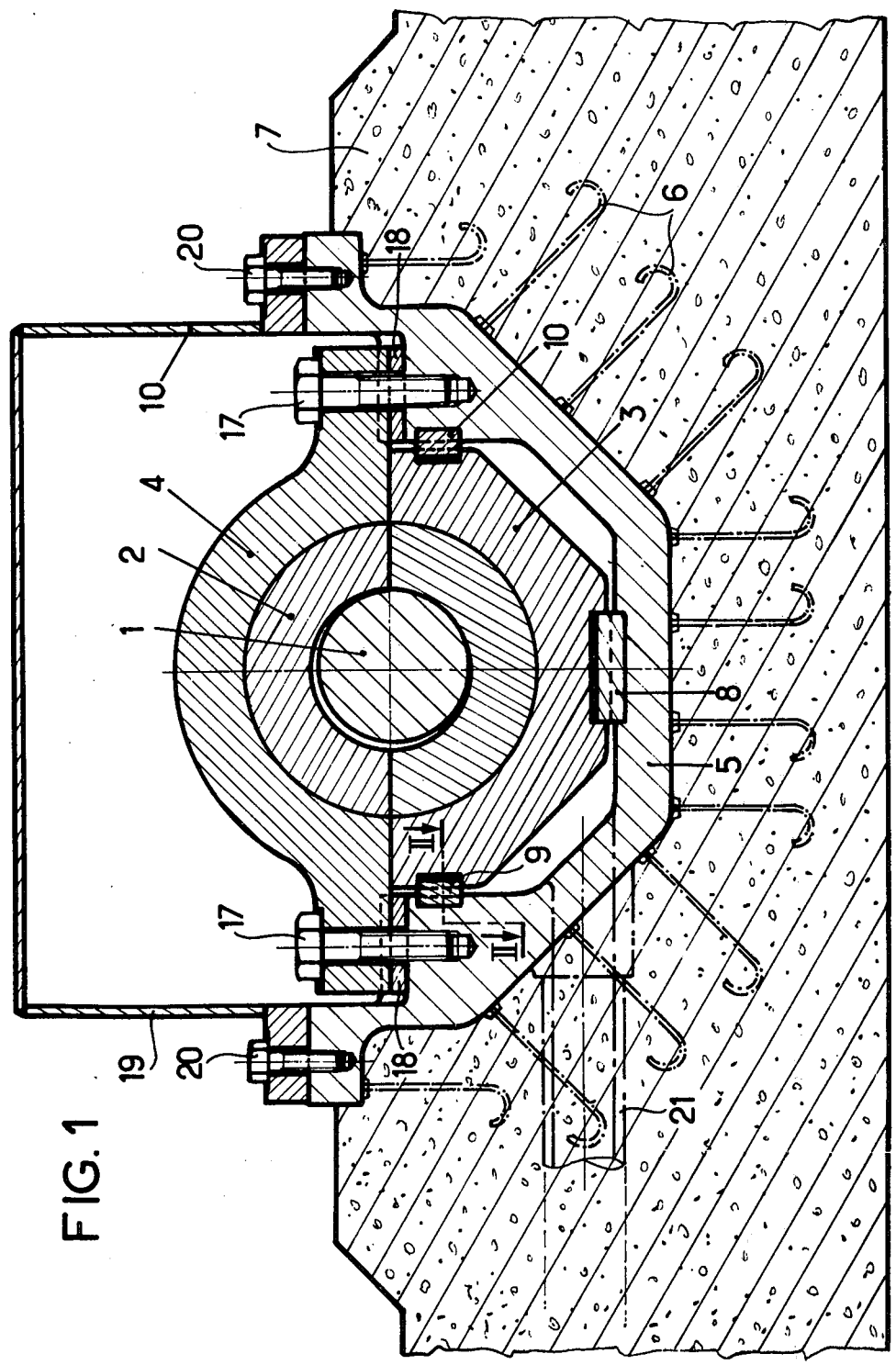

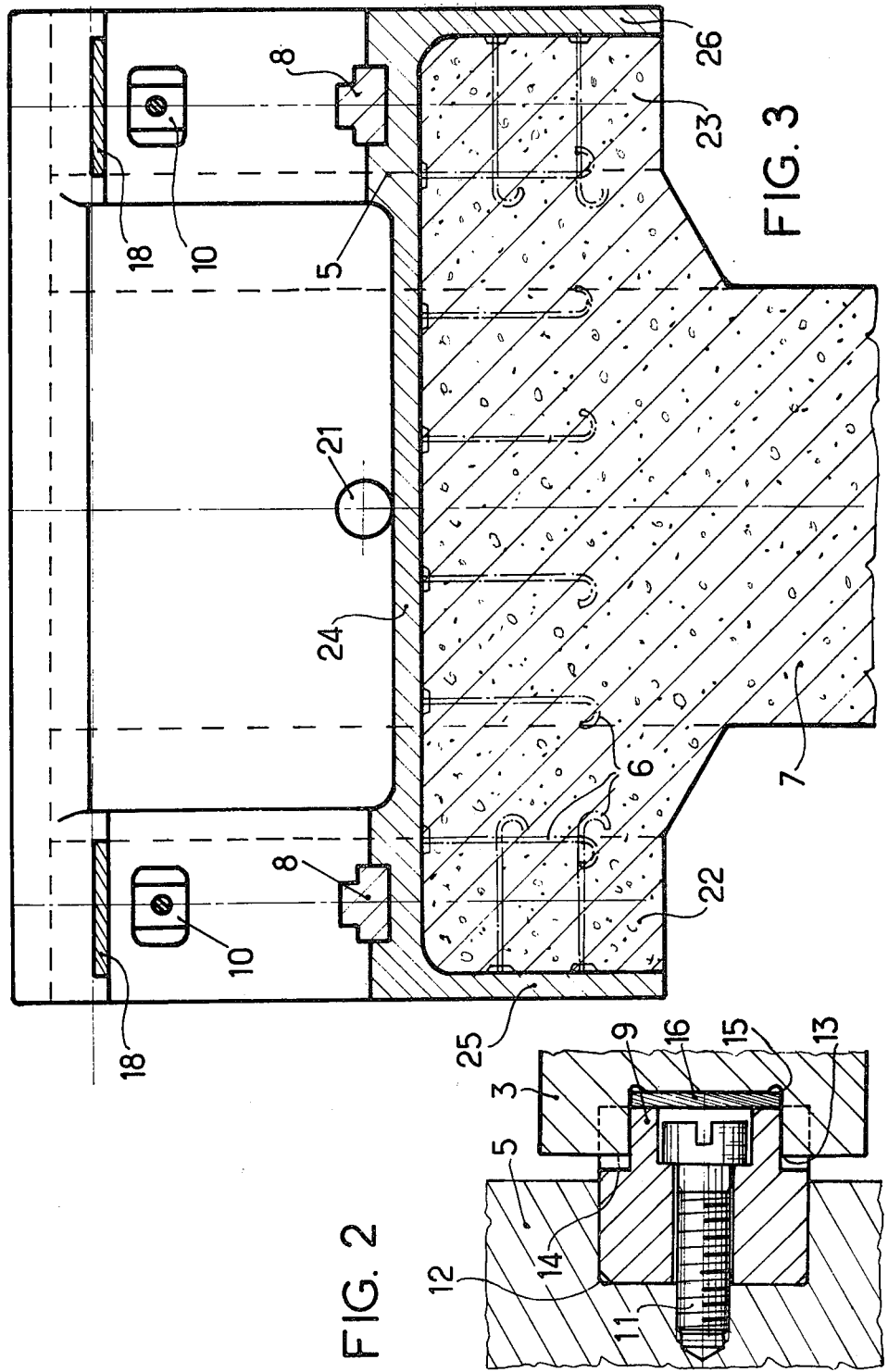

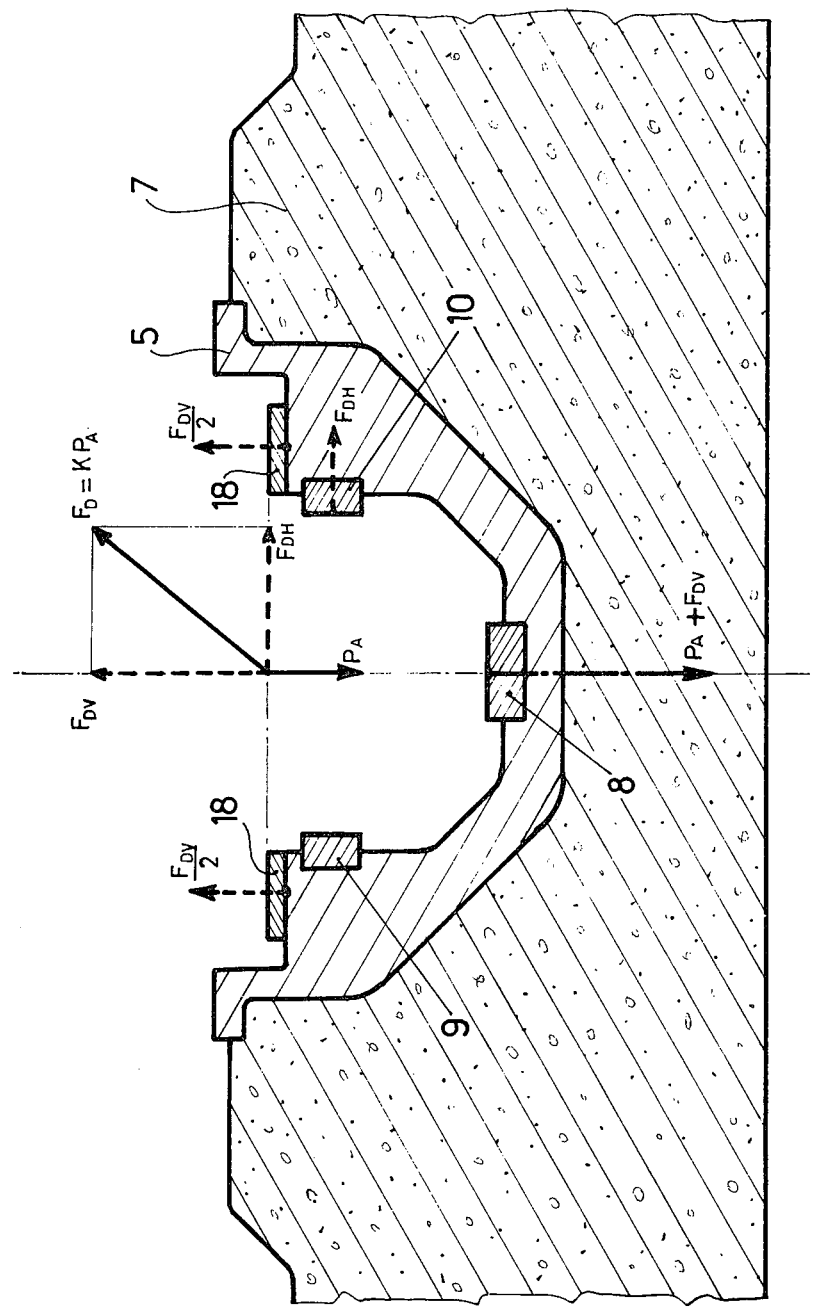

DEVICE FOR FIXING A BEARING ON A CONCRETE MASS

BACKGROUND OF THE INVENTION

Field of the Invention

The invention concerns the fixing of a bearing such as a bearing of a turbo-alternator group, on a concrete mass.

1. Description of the Prior Art

Such bearings are at present fixed by a shoe integral with the bearing, which rests on metallic plates installed on blocks of cement and sunk in a cement casting. The vertical stresses exerted on the bearings and directed upwards are contained by bolted rods crossing the concrete mass and tending to apply the shoe hard against the cement blocks, but those rods undergo a certain elongation which is detrimental to the rigidity of the fixing.

2. Summary of the Invention

The present invention is intended to ensure a very rigid fixing of the bearings. It provides, for that purpose, a fixing arrangement, on a concrete mass, of a bearing comprising a journal, a journal case constituted by a support and a collar, characterized in that this case rests on a metallic frame which surrounds the said stand and which is provided with arms in the form of projecting hooks sunk in the concrete mass.

With reference to the accompanying diagrammatic figures, an example, having no limiting character, for the implementing of the invention, will be described.

BRIEF DESCRIPTION OF THE DRAWINGS

FIG. 1 is a cross-section perpendicular to the axis of a bearing installed in a concrete mass.

FIG. 2 is the cross-section of a chock inserted between the support and the frame of the bearing.

FIG. 3 is an axial cross-section view, on a smaller scale, of a mass of concrete and of the metallic frame of two bearings installed on that mass.

FIG. 4 is a very diagrammatic cross-section view, perpendicular to the axis, of the frame of a bearing installed in a concrete mass, making it possible to see the distribution of the efforts.

DESCRIPTION OF THE PREFERRED EMBODIMENT

In FIG. 1, a bearing accomodates a shaft 1 in a journal 2 surrounded, at its bottom part, by a support 3 and, at its top part, by a collar 4. The support 3 and the collar 4 rest on a U-shaped metallic frame 5 provided with metallic arms or hooks 6 sunk in a concrete mass 7 which forms, for example, a beam.

The support 3 rests on the frame 5 by means of a chock 8 situated in the bottom of the frame and of two lateral chocks 9 and 10. FIG. 2 represents a cross-section of one of those chocks, for example, along line II—II of the chock 9 in FIG. 1. That chock 9 is fixed by a screw 11 and it is embedded in a hollowed out part 12 of the frame 5. Its vertical faces 13 and 14 are machined to penetrate exactly in a recess 15 provided in the support 3, the portion of material removed being shown by a discontinuous line. A plate 16 ensures the end fitting.

The collar 4 is fixed on the frame 5 by screws 17, the fitting plates 18 boxing fitted there-between. A protective hood 19 is fixed by screws 20 to the frame 5. The coil recovery tube is shown at 21.

FIG. 3 shows that the mass 7 is in the shape of a beam in an overhanging configuration which bears, on each of its two overhanging parts 22, 23, a bearing shown only by the frame 5, the chocks 8 and 10 and the plates 18. The metallic frame 5 extends from one bearing to another along the portion 24 and also covers the sides of the beam along the extensions 25 and 26 which, also provided with arms or hooks 6, increase the strength of the beam in the overhanging parts 22, 23.

FIG. 4 illustrates the distribution of the stresses when the bearing is subjected to the weight PA of the shaft 1 and to a dynamic rotating stress FD which can be broken down into a vertical stress FDV and a horizontal stress FDH. The weight PA is supported by the chock 8 if; it is directed downwards, if the resultant force $P_a +$ FDV is downward, by the chock 8, or if it is directed upwards, it is absorbed by the screws 17. The stress is supported, according to whether it is directed towards the left or towards the right, by a chock 9 or by the chock 10.

I claim:

1. In a mounting arrangement, on a concrete mass, of at least one bearing comprising a journal and a journal case constituted by a support and a collar, the improvement wherein: said journal case rests on a metallic frame which surrounds said support and which is provided with a plurality of projecting arms sunk in the concrete mass.

2. The mounting arrangement according to claim 1, wherein; said frame is U-shaped and the support rests in the metallic frame by means of a wedge chock centrally situated at the bottom part of the frame and by two lateral chocks above said wedge chock and to respective sides thereof.

3. The mounting arrangement according to claim 1 wherein said bearings are two in number, are installed on a same concrete mass, and wherein metallic frames of the two bearings are integral with each other.

4. The mounting arrangement according to claim 3, in which the concrete mass forms a beam in an overhanging configuration with two overhanging parts each accomodating a bearing, and wherein the metallic frames comprise extensions covering the overhanging parts and provided with arms sunk in those overhanging parts.

* * * * *